July 21, 1931.    R. H. OWENS    1,815,161
INSTRUMENT
Filed Nov. 14, 1928    3 Sheets-Sheet 2
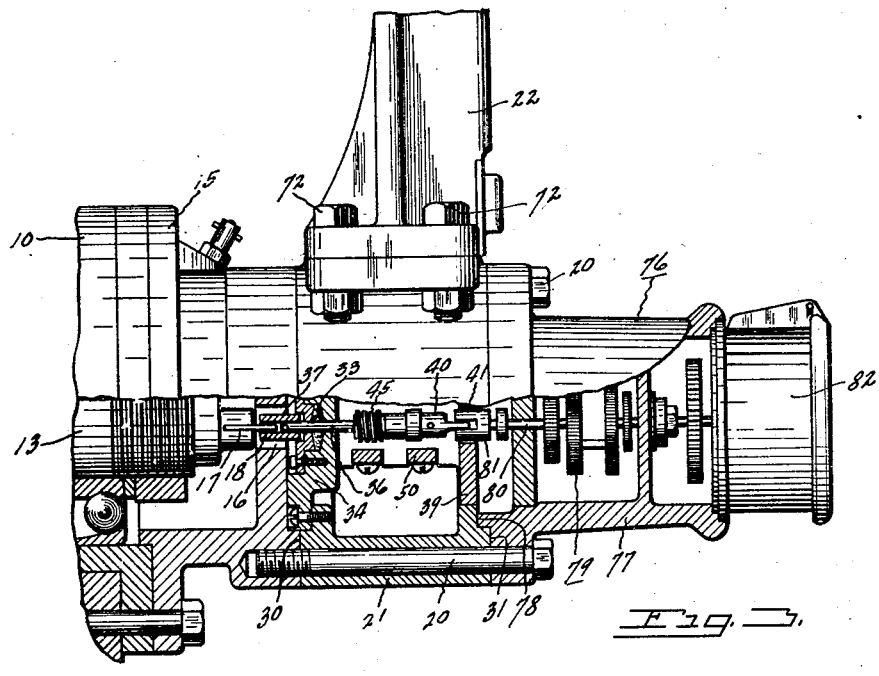
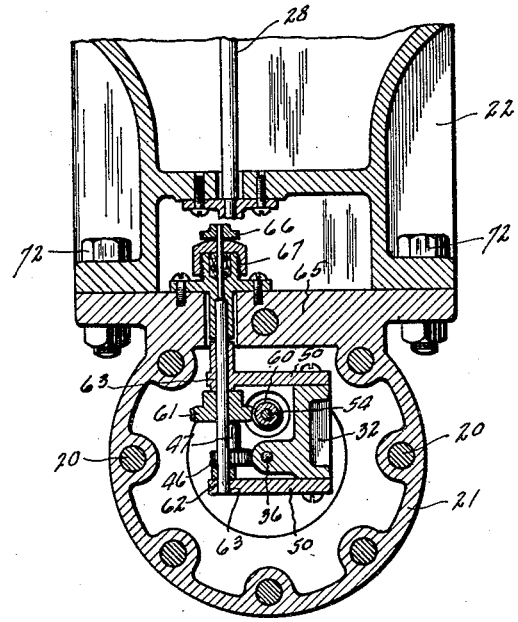
INVENTOR
Robert H. Owens
BY Maréchal and Noe
ATTORNEYS

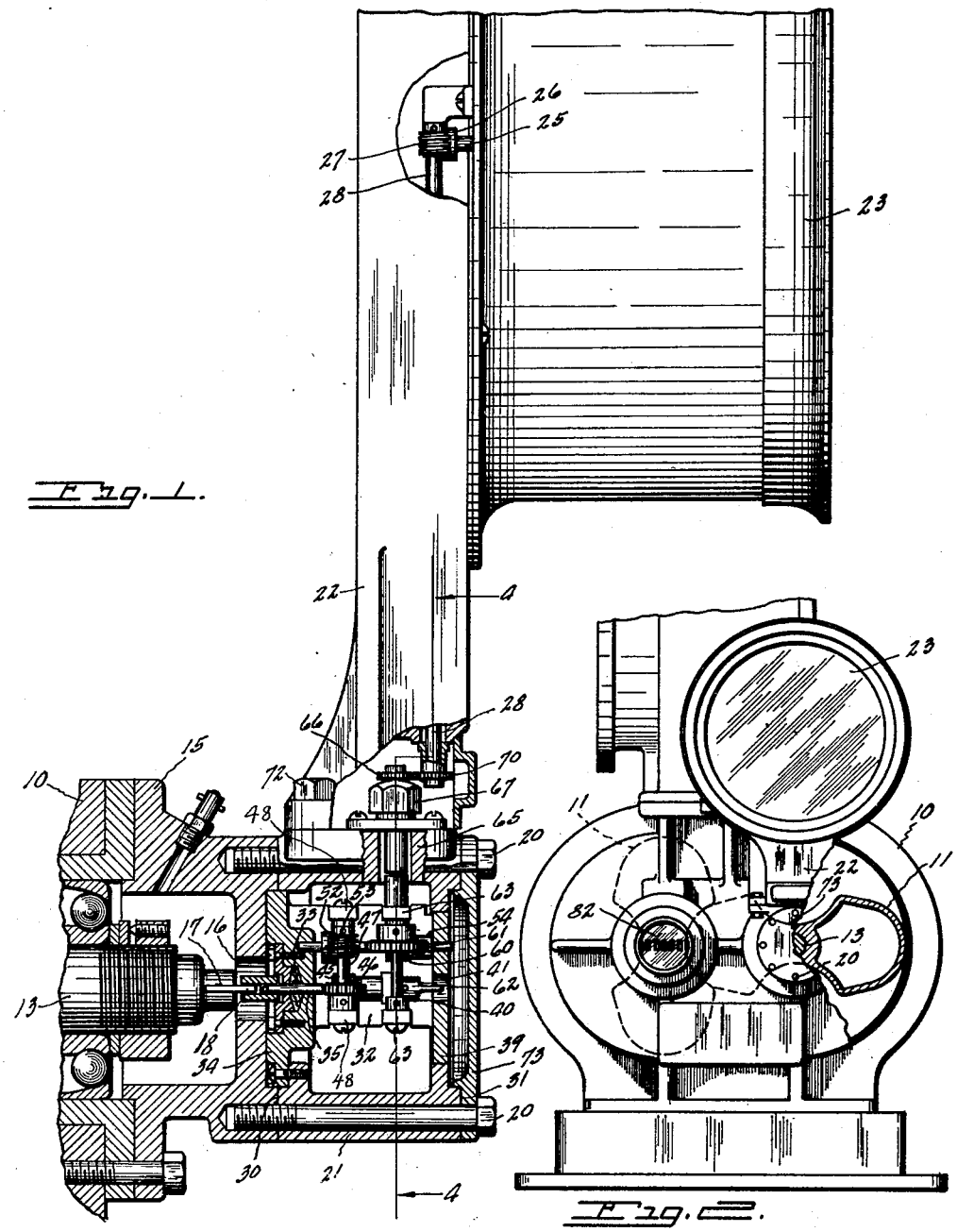

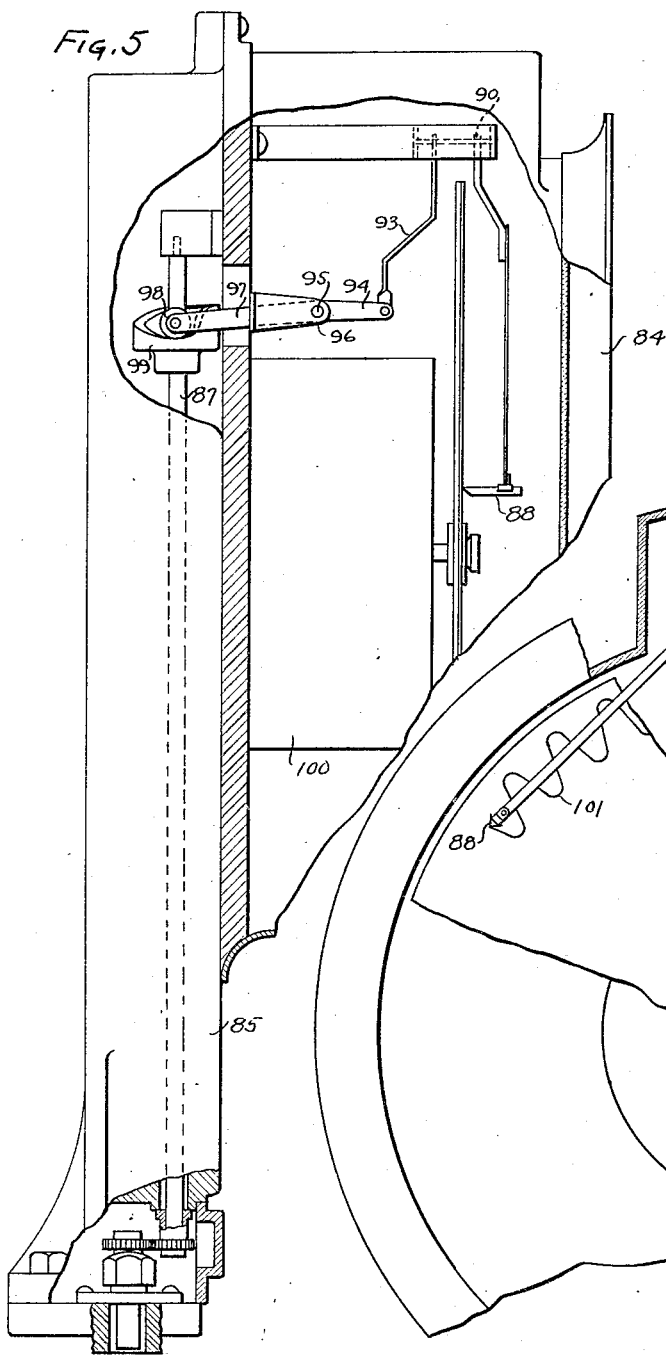
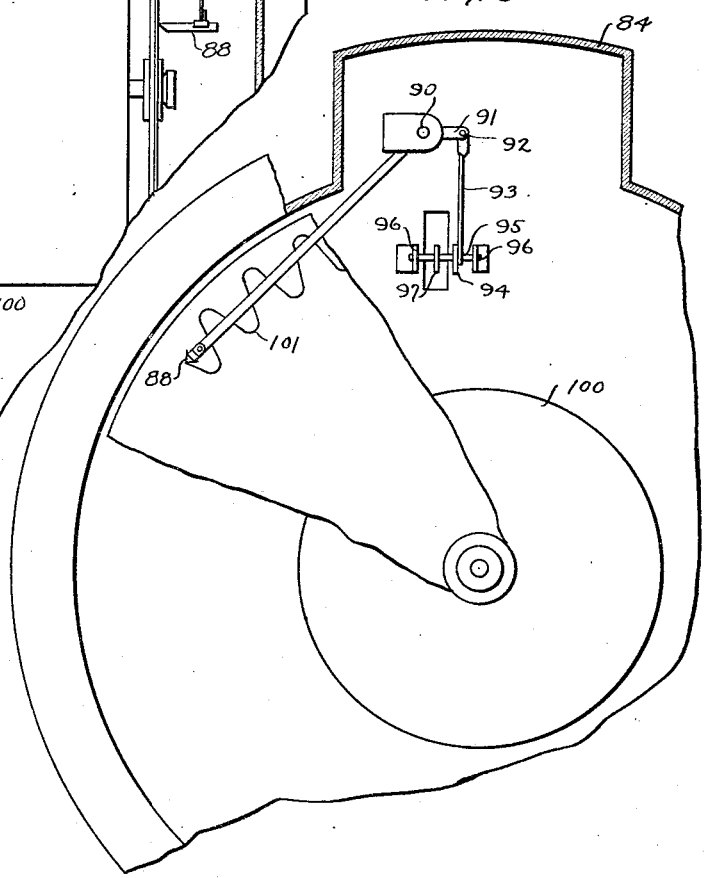

Patented July 21, 1931

1,815,161

UNITED STATES PATENT OFFICE

ROBERT H. OWENS, OF CONNERSVILLE, INDIANA, ASSIGNOR TO THE P. H. & F. M. ROOTS COMPANY, OF CONNERSVILLE, INDIANA, A CORPORATION OF INDIANA

INSTRUMENT

Application filed November 14, 1928. Serial No. 319,331.

This invention relates to instruments for recording or indicating various measurements, and particularly to instruments adapted for use with fluid-handling apparatus.

One object of the invention is the provision of an instrument of this character having a casing and drive mechanism therein so arranged that the casing may be attached to a similar casing of another instrument or to a meter, as desired, with the drive mechanism operably connected to an operating part of the drive mechanism of the other instrument or of the meter.

Another object is the provision of an instrument having a casing containing speed-reducing mechanism with a driving or driven coupling member for the speed-reducing mechanism at opposite ends of the casing, the opposite ends of the casing and the coupling members being arranged so that the instrument may be connected in driving or driven relationship with a similar instrument.

Other objects and advantages of the invention will be apparent from the following description and from the accompanying drawings in which—

Fig. 1 is a side elevation, partly in section, of an instrument embodying the present invention, mounted on a fluid-handling apparatus;

Fig. 2 is an end view of a fluid-handling apparatus provided with instruments embodying the present invention;

Fig. 3 is a side elevation, partly in section, of a plurality of instruments mounted in place in accordance with this invention;

Fig. 4 is a section on the line 4—4 of Fig. 1.

Fig. 5 is a side elevation of an instrument showing a pen controlled from the meter shafts; and Fig. 6 is a front elevation of the instrument shown in Fig. 5.

This invention has reference to measuring instruments for recording or indicating various measurements, but as herein shown and described the instruments are of the type adapted to be used in conjunction with fluid-handling apparatus such as a gas meter of the widely-known Roots blower type, although of course the invention is not thus necessarily limited in scope.

In the drawings in which similar reference numerals designate corresponding parts in the various views, 10 indicates the housing of a fluid-handling apparatus embodying rotary lobed impeller means 11 mounted on the rotor shafts 13. The housing 10, through which the gases or other fluids to be measured or handled flows, is generally of elliptical cross-section as shown, having opposite inlet and outlet openings adapted for connection in any suitable manner to fluid-carrying pipes. It will be apparent that the number of revolutions of the rotary metering means 11 is generally proportional to the amount of fluid passing through the meter since the latter is of the positive displacement type. However, it is often desired to obtain indications or permanent records of various fluid factors such as temperature, pressure, time, etc. as well as volume to give accurate readings of the fluid conditions of the meter. And it is with particular reference to instruments of this character that this invention is described although obviously the invention is not thus necessarily limited in scope.

The meter housing 10 adjacent an end of a rotor shaft 13 is provided with an attachment plate 15 which substantially encloses the end of the rotor shaft. Preferably both ends of each of the rotor shafts are constructed in a similar manner so that instruments or power drives or take-offs may be connected to any of the rotor shaft ends as desired. Each attachment plate is provided with an opening 16 in alignment with the rotor shaft to provide access to the end of the rotor shaft, which is provided with a coupling member 17 having a tongue 18 of noncircular form through which power may be supplied from the rotor shaft.

Mounted on the attachment plate 15 by means of suitable fastening bolts 20 is a casing 21. To this casing is fixed a bracket 22 which supports suitable measuring apparatus as indicated at 23. This measuring apparatus embodies a member such as a chart or a pen, pointer, or the like, which is movable in accordance with the revolutions of the rotor shaft. In Fig. 1 the chart of the instrument is connected to a central shaft 25 on the end of which is a worm-wheel 26 driven by a worm 27 provided on shaft 28 in the bracket 22. This shaft 28 is connected as will be presently described through speed-reducing mechanism to the rotor shaft so that the instrument chart or other member driven from shaft 28 is moved proportionally to the revolutions of the rotor metering means of the meter. The instrument may embody pressure, temperature, time or other operated members so that suitable measurements may be made of fluid conditions of the meter.

The casing 21 is provided with opposite attaching sides 30 and 31 of complementary form or construction. That is, the side 31 is similar to the side of the attaching plate 15, and the side 30 is adapted to be fit against the side of the attachment plate 15. This provides a construction which enables a similar instrument, or an instrument having casing similar to the casing 21 to be attached to the side 31 so that both instruments may be connected together and driven from the same rotor shaft of the meter.

On the side 30 of the casing 21 is a wall 34 having a small opening 35 preferably centrally arranged on this side of the casing. Through the opening 35 extends a shaft 36, which projects somewhat beyond the attaching side 30 of the casing and carries a coupling member 37 adapted to be coupled to the tongue 18 of the coupling member 17 on the rotor shaft. The coupling members 37 and 17 are of complementary construction so that one is placed in driving relationship with the other when the casing is mounted in position on the attachment plate 15. The shaft 36 extends towards the wall 39 on the side 31 of the casing and carries a coupling member 40 adjacent an opening 41 in this wall 39 so that the coupling member 40 is accessible from the exterior of the casing through this opening 41. The coupling member 40 is of a construction similar to that of the rotor coupling 17, and is complementary in construction to the coupling member 37 on the opposite end of the shaft 36. Thus the coupling member 40 may be placed in driving relationship with a coupling member similar to the coupling 37 of another casing which may be attached to the attaching side 31 of the casing, as where more than one instrument is to be driven from the same rotor shaft end of the meter. The shaft 36 is rotatably supported in a bracket 32 within the casing as well as by the wall 34, and the shaft diameter, where it extends through the wall 34 is quite small so as to reduce friction effect. Suitable packing material 33 is provided adjacent the opening in the wall 34 through which the shaft 36 extends to prevent leakage or loss of pressure through this wall.

The shaft 36 carries a worm 45 which engages a worm-wheel 46 on a spindle 47 which is suitably journaled at 48 in plates 50 fixed to the bracket 32. The spindle 47 carries a worm 52 which engages a worm-wheel 53 on a spindle 54 extending as shown parallel to the shaft 36 and spaced above it, this spindle 54 being mounted at its opposite ends in the walls 34 and 39 of the casing 21. On the spindle 54 is a worm 60 which engages a worm-wheel 61 on a spindle 62 suitably journaled in the plates 50 as indicated at 63. This spindle 62 is thus driven at a speed which is proportional to the speed of revolution of the rotor shaft but at a greatly decreased speed due to the provisions of the speed-reducing mechanism just described. Spindle 62 extends upwardly through the top wall 65 of the casing 21 and carries adjacent its upper end a pinion 66. Where the spindle 63 extends through the wall 65 of the casing the latter is provided with a packing gland 67 packed with suitable material to prevent leakage or loss of pressure at this point. The spindle 62 at its upper end is quite small in diameter adjacent the point where the packing material is provided so that friction at this point is a minimum, and as the spindle 62 rotates very slowly it will be obvious that the frictional effect exerted by the packing has practically no effect on the revolution of the meter rotors.

The pinion 66 on the upper end of the spindle 62 Fig. 1, turns pinion 70 on the lower end of the shaft 28, which is arranged in the bracket 22 in parallel relationship with the spindle 62. The bracket 22 in which the shaft 28 is carried is detachably fastened by means of suitable bolts 72 to the upper side of the instrument casing 21, and when in place on the instrument casing it will be apparent that the pinions 66 and 70 are in mesh, the arrangement however being such that the bracket 22 may be easily withdrawn away from the casing 21, the pinion 70 being of course removed with the bracket while the pinion 66 remains at the upper side of the instrument casing. The bracket 22 may thus be conveniently replaced by brackets containing other transmission shafting and gearing for driving other instruments.

Where it is desired that a single instrument be mounted at the end of one of the rotor shafts, as shown in Fig. 1, a cover plate 73 is placed on the attaching side 31 of the casing 21 to close this end of the casing. The opposite end of the casing as previously mentioned is practically sealed pressure tight by the packing provided around the shaft 36 in the wall 34 of the casing. However, if any leakage or loss of pressure obtains along the shaft 36 into the interior of the casing 21 the loss of this pressure from the casing is pre vented effectively by the presence of the cover plate 73 and by the packing for the spindle 62 in the upper wall 65 of the casing. However, where other instruments having casings similar in construction to the casing 21 and having coupling members and gear-reducing mechanism similar to those provided for the casing 21, the cover plate 73 is removed to permit the connection of the attaching side of such other casing directly on the attaching side 31. The casings being similar, it will be apparent that the speed-reducing mechanism in the casing attached to casing 21 will be operably driven through the shaft 36, and thus the casing 21 and the mechanism it encloses provides a unitary construction to which instruments of various characters may be attached and to which or from which driving power may be supplied. For example, the casing 21 may have attached to it a bracket supporting a combined pressure, temperature and volume recording apparatus, the indicating needles or pointers of which are moved in accordance with these factors of the fluid handled by the meter; and a second casing similar to the casing 21 may support a demand recorder for example, which indicates the volume passing through the meter in stated time intervals. Or as shown in Fig. 3 an integrating mechanism designated generally 76 may replace the cover plate 73. This integrating mechanism embodies a case 77 having an attaching side 78 similar in construction to the attaching side 30 of the casing 21. The case 77 contains suitable speed-reducing mechanism indicated generally 79 which is operated from the shaft 80 the end of which carries a coupling member 81 which engages the coupling member 40 of the shaft 36 in casing 21. Integrating counters are provided in the chamber 82 on the end of the case 77. The provision of an attaching side 78 on the case 77 of the integrating instrument similar in shape to the attaching side 30 of casing 21 permits the attachment of this case 77 directly to the attachment plate 15 of the meter as well as to the outer side of another instrument. Thus, as shown in Fig. 2 one of the rotor shafts may be provided with a case 77 containing suitable integrating mechanism in the case 82, while the other rotor shaft carries merely a casing 21 with cover plate 73, which support the bracket 22 of the apparatus 23.

In Figs. 5 and 6 is shown a form of instrument in which the volume pen is controlled by the meter, this instrument being adapted to be substituted for the instrument apparatus 23 shown in Fig. 1. The instrument 84 shown in Figs. 5 and 6 comprises a bracket 85, the lower portion of which is formed like the lower portion of the bracket 22 of apparatus 23 so that it may be attached to the top of the main casing 21, and driven therefrom. The instrument 84 is provided with an upright operating shaft 87 similar to the shaft 28, and similarly provided with driving means at its lower end. This shaft instead of operating the chart is adapted to operate the volume or indicating pen 88 which is pivotally connected at 90 on a suitable stud in the instrument. The upper end of the volume pen is rigid with an arm 91 which is pivoted at 92 to an arm 93 connected at its lower end to a lever arm 94 on shaft 95. Shaft 95 is rotatably mounted in suitable bearings 96 and is provided with a rigid arm 97 carrying at its rear end a suitable roller or other similar device 98 which operates on a cam 99 fixed to the upper end of the shaft 87. This cam is provided with an upper wavy surface so that as shaft 87 is slowly rotated at a speed proportionate to the speed of rotation of the rotor members of the meter, arms 97 and 94 will be oscillated about the axis of the shaft 95 causing a periodical oscillation of the volume pen 88 about its axis 90. The chart in the meantime is revolved by means of suitable clock work 100 so that a wavy line as shown in Fig. 6 at 101, of constant amplitude, is produced on the chart, the number of waves in the line being an indication of the amount of fluid passing through the meter, in any given time as shown on the chart. This instrument may also be provided with other recording pens or the like which move in accordance with temperature and pressure, the chart having index references for such pens where they are used, these additional pens being arranged to operate on a central part of the chart while the volume pen preferably operates back and forth on the peripheral portion. As these additional pens are of well known construction they have not been shown nor described in detail.

It will be apparent that in accordance with this invention measuring instruments of different character and adapted for use with meters of widely different sizes may be provided, as for measuring the revolutions of the rotor shafts, fluid-line pressure, fluid temperature, differential pressures, and time; and that various instruments may be interchangeably connected to the attachment plate of the meter or to another instrument or instruments, and that the bracket-supporting casings and their contained speed-reducing mechanism may be standardized so that when used on meters of different sizes and capacities it is merely necessary to employ computation constants in connection with the indications or records, dependent upon the size of the meter with which an instrument is used.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A measuring instrument adapted to be fixed to a fluid-handling apparatus, comprising a casing having opposite attaching sides of complementary construction so that it may be attached to and support a similar casing, measuring apparatus mounted on said casing, mechanism in said casing for driving said apparatus, said mechanism having a coupling member accessible from the exterior of one of said casing sides and having a coupling member accessible from the exterior of the other of said casing sides, said coupling members being of substantially complementary form so that said mechanism may drive or be driven by an instrument having similar casing sides and coupling members.

2. A measuring instrument of the class described comprising a casing having opposite attaching sides of complementary construction, a bracket detachably connected to said casing, measuring apparatus on said bracket, mechanism in said casing for driving said apparatus, said mechanism having a driving coupling member accessible from the exterior of one of said casing sides and having a driven coupling member accessible from the the exterior of the other of said casing sides, said coupling members being of substantially complementary form.

3. A measuring instrument of the class described comprising a casing having opposite attaching sides of substantially complementary construction, a shaft in said casing extending between said attaching sides, a coupling member on each end of said shaft, said coupling members being of complementary form, measuring apparatus fixed to said casing, and speed-reducing mechanism in said casing for operably interconnecting said shaft and said measuring apparatus.

4. A measuring instrument of the class described comprising a casing having opposite attaching sides of substantially complementary construction, a shaft extending through said casing from one side to the other, a coupling member adjacent each end of said shaft, said coupling members being of complementary form, a driven slow-speed shaft of small diameter extending through a wall of said casing, packing between said slow-speed shaft and said wall, speed-reducing mechanism in said casing between said first-named shaft and said slow-speed shaft, and an instrument bracket detachably supported on said casing adjacent said wall and having instrument-operating mechanism operably connected to said slow-speed shaft.

5. A measuring instrument of the class described comprising a casing having attaching sides provided with openings substantially centrally thereof, a shaft in said casing extending between said openings, coupling members of complementary construction on the ends of said shaft and arranged with relation to the sides of said casing to be placed in driving relationship with similar shafts of similar casings, measuring apparatus supported on said casing, and speed-reducing mechanism between said shaft and said measuring apparatus.

6. A measuring instrument of the class described comprising a casing having opposite attaching sides arranged for attachment to a similar casing, a shaft extending through said casing, a coupling member at one end of said shaft, means for driving a similar coupling member from the other end of said shaft, speed-reducing mechanism in said casing including a driven slow-speed shaft, a bracket detachably connected to said casing, said bracket having driven mechanism operably connected to said slow-speed shaft, and measuring apparatus mounted on said bracket and having a member adapted to be operated proportionally to the movements of said first-named shaft, and means operably connecting said member to the driven mechanism in said bracket.

7. In combination, a fluid meter having a housing and a rotor shaft provided with a coupling member at one end thereof, and a measuring instrument comprising a casing having opposite attaching sides of complementary construction, one of said sides being connected to the meter housing adjacent the end of said shaft, measuring apparatus mounted on said casing, mechanism in said casing for driving said apparatus, said mechanism including a driving coupling member extending through one of said attaching sides in the casing and adapted to be engaged with the coupling member on said rotor shaft, and means in said casing operating at the same speed as said driving coupling member and having a construction similar to that of the coupling member on said rotor shaft.

8. A measuring instrument of the class described comprising a casing having opposite sides of complementary form so that the casing may be attached to and supported from a similar casing and so that the casing may have a similar casing attached to and supported thereby, measuring apparatus supported by said casing, and mechanism in said casing for driving said apparatus, said mechanism having a coupling member accessible from the exterior of one of said casing sides.

9. A measuring instrument of the class described comprising a casing having opposite sides of complementary construction that one side may be attached to and support a similar casing and the other side may be attached to and supported by a similar casing, measuring apparatus supported by said casing, and mechanism in said casing for driving said apparatus and having a coupling member operably connected to said mechanism and accessible from one side of the casing, and having a second coupling member of complementary construction and accessible from the other side of the casing.

10. A measuring instrument of the class described comprising a casing having opposite sides of complementary construction that one side may be attached to and support a similar casing and the other side may be attached to and supported by a similar casing, measuring apparatus supported by said casing, and mechanism in said casing for driving said apparatus, said mechanism including a shaft extending from one side to the other of said casing and having a coupling member projecting from one side and a complementary coupling member within the other side.

In testimony whereof I hereto affix my signature.

ROBERT H. OWENS.